Sept. 25, 1934.                F. G. SLAGEL                1,974,631
REFRIGERANT CONTROL VALVE
Filed Jan. 19, 1933
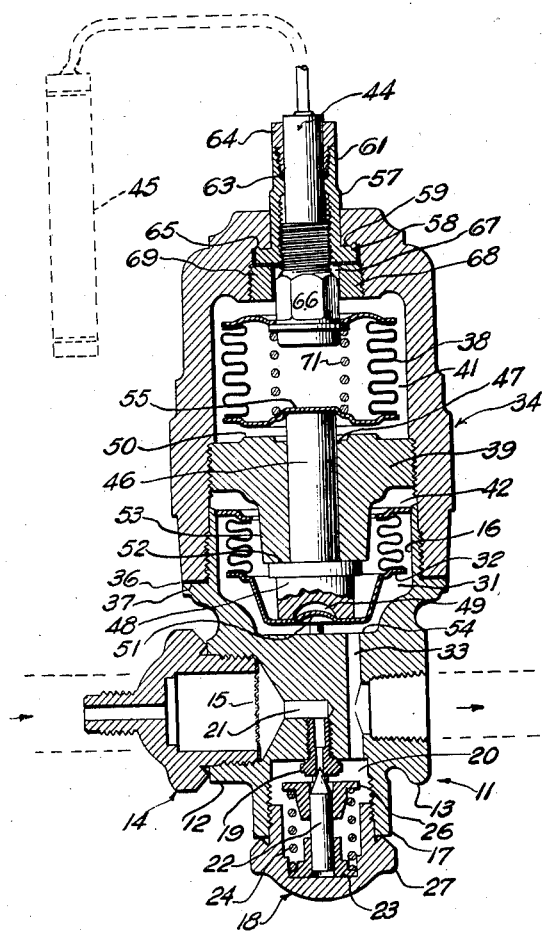
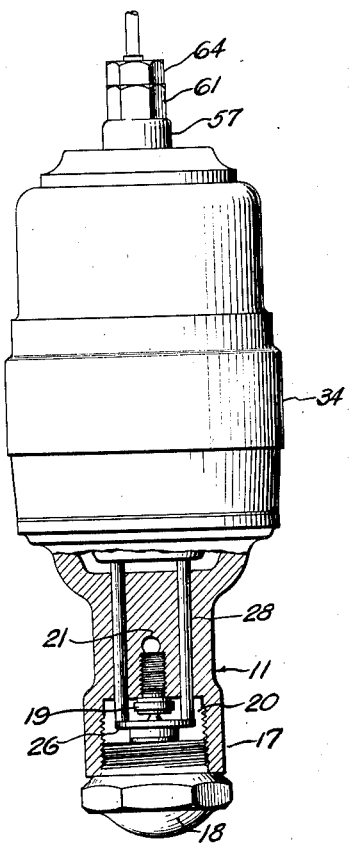
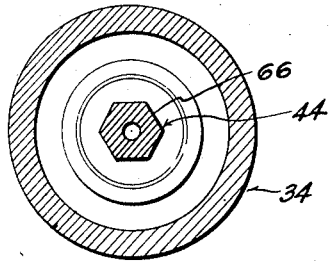
Inventor
Franklin G. Slagel
By
Albert R. Henry
Attorney Patented Sept. 25, 1934

1,974,631

UNITED STATES PATENT OFFICE 1,974,631

REFRIGERANT CONTROL VALVE

Franklin G. Slagel, Buffalo, N. Y., assignor to Fedders Manufacturing Company, Inc., Buffalo, N. Y.

Application January 19, 1933, Serial No. 652,519

4 Claims. (Cl. 236—92)

The invention relates to a control valve for refrigeration systems, and more particularly to a valve which is responsive to both temperature and pressure conditions.

This type of valve is usually referred to as a thermostatic expansion valve, and the present invention concerns improvements therein with the objects of preventing the entry of moisture to the thermostatic unit and simultaneously protecting the same from the low temperatures existent in the associated expansion unit. The structural features of the invention will, therefore, be found to be chiefly directed to these protective objectives, together with a novel arrangement of parts resulting in a compact structure, as more fully described in the accompanying drawing, wherein:

Fig. 1 is a front elevation of the device with portions broken away to show the operating connection between the expansion bellows and the valve;

Fig. 2 is a section on the line 2—2 of Fig. 1;

Fig. 3 is a section on the line 3—3 of Fig. 2.

The valve is provided with a cross fitting, or body 11 which is formed with opposed horizontal bosses 12 and 13, the former receiving a filter fitting 14 communicating with the "high" or condenser side of a refrigerating system, and the latter receiving a suitable pipe for connection with the "low" or evaporator side of the system. A fine mesh screen 15 is secured to the fitting 14 to remove adventitious foreign particles from the incoming refrigerant. The body 11 is also formed with an enlarged vertical boss 16 providing a mounting means for the thermostatic unit, hereinafter described, and a lower boss 17 through which a valve unit 18 is inserted.

The valve unit 18 comprises a seat member 19 mounted within the valve chamber 20 of the body 11 and in communication with the fitting 14 and the "high" side of the system through a drilled passage 21. A valve 22 is seated on the seat member 19 and it is guided for vertical movement in a flanged bushing 23, which also serves as a mounting for one end of a valve spring 24. The opposite end of the spring 24 engages a thrust member 26 which is secured to the valve 22.

A cap member 27 receives the bushing 23 and it is screwed into the boss 17 to close the valve chamber 20 and to compress the valve spring 24, whereby the valve 22 is seated under a predetermined load. The valve is adapted to be opened by the downward movement of a pair of push rods 28 which engage the thrust member 26 and are under control of thermostatic or pressure operated means.

The boss 16 is formed with an open chamber 31 which receives a pressure or sealing bellows 32. The upper end of the bellows 32 is secured in the throat of the chamber 31, while the free or movable end thereof engages the protruding ends of the push rods 28. The exterior of the bellows 32 and the interior of the chamber 31 is in direct communication with the output boss 13 or "low" side of the system through a drilled hole 33, which also establishes communication with the valve chamber 20.

A housing 34 is screwed on the exterior of the boss 16 and it engages a packing member 36 mounted on a flange 37 of the body 11, which seals the interior of the housing against communication with the outer atmosphere. A thermostatic or power bellows 38 is mounted within the housing 34 near the upper end thereof and it is thermally separated from the sealing bellows 32 by a wall portion 39, which thus divides the space within the housing into a power chamber 41 and a sealing chamber 42. To permit assembly of the power bellows the wall portion 39 is constructed as a removable plug and it is threaded externally for mounting on a cooperating threaded portion in the housing.

The upper end of the power bellows 38 is secured to a hollow stem 44 which extends through the housing 34 and communicates with an expansion bulb 45. This end of the bellows is retained in a relatively fixed position by means of an adjustable connection with the housing as hereinafter described. The free end of this bellows is mechanically connected to the sealing bellows 32 by a rod 46, which is mounted for sliding movement in a bearing orifice 47 formed in the wall portion 39. The lower end of the rod is formed with a head 48 having a recessed tip 49 for receiving a centering projection 51 formed on the free end of the sealing bellows 32.

The shoulder 52 of the head 48 is engageable against the face of a projection 53 of the wall member and it thus acts as an upper limit stop for the bellows 32, while the adjacent bottom wall 54 of the chamber 31 provides a lower stop. Thus the sealing bellows 34 is maintained within a predetermined range of movement and is thereby protected against excessive collapsing movement and the accompanying danger of cracking. Similarly, excessive downward movement of the power bellows 38 is prevented by a circular pad 50 formed on the top of the wall member 39. It will also be noted that the upper extremity of the rod engages in a depressed portion 55 of the power bellows 38 and thus also retains this bellows in concentricity.

The previously mentioned adjustment of the power bellows 38 provides a means for varying the characteristics of operation of the entire device. This means comprises an internally threaded sleeve 57 which engages an external thread on the exterior of the stem 44 and which is retained against axial movement by the engagement of its flange 58 against a corresponding shoulder 59 formed in the housing 34. The projecting end 61 of the sleeve 57 is formed with a hexagonal head which may be manipulated to vary the axial position of the stem 44 and bellows 38. Means are also provided to seal the adjustable connection so that moisture is not admitted to the otherwise sealed chambers within the housing. The joint between the sleeve 57 and stem 44 is sealed by a packing 63 compressed by a packing nut 64, while the joint between the sleeve 44 and the housing 34 is closed by the contact of a seat portion 65 formed on the flange 58 and the shoulder 59 of the housing.

During adjustment, rotation of the bellows is prevented by keying the stem 44 to the housing. This may be accomplished in a number of manners, but it is preferred to form the stem with a hexagonal portion 66 slidably mounted within a hexagonal recess 67 in a nut 68, which is screwed into the housing. A gasket 69 may be interposed between the nut 68 and sleeve 57 to act as an additional seal.

The adjustment of the bellows 38 directly affects the tensioning of a spring 71 mounted therewithin. This spring is under tension during the entire range of adjustment and at all times exerts an upward force on the sleeve flange 58 to retain its seat portion in sealing relation.

In operation, the bulb 45 is secured in intimate thermal contact with the evaporator or cooling unit, and the fluid therein expands or contracts in response to temperature variations, and correspondingly causes the expansion or contraction of the power bellows 38. In the former case, the bellows urges the rod 46 downward, which in turn depresses the sealing bellows 32 and push rods 28, thereby opening the valve 22 to permit the entry of liquid refrigerant to the evaporator.

Upon contraction of the power bellows, it will be obvious that the above action will be reversed and the pressure on the valve 22 will be released so that its spring 24 will restore it to its seat.

The above described action of the power bellows 38 is usually aided and supplemented by the sealing bellows 32, which being responsive to differences in pressure in the chamber 31 and the "low" side, contracts or expands accordingly. Under certain unusual conditions, however, the sealing bellows 32 may act independently of the power bellows, and thus this element, which is pressure responsive, may oppose the thermostatic element until a state of equilibrium is reached, or until a normal operating condition is attained.

It has been found that some advantages are obtained if the rate of heat transfer between the bellows is retained at a minimum. The sealing bellows 32, of course, is normally maintained at a low temperature and the power bellows is protected therefrom by constructing the housing 34, together with the wall portion 39 and rod 46, of a material having a negligible heat transfer characteristic. Phenolic resin compositions are recommended for these parts.

An additional advantage is also gained from the use of such material, in that it forms a good seat for the seal between the sleeve 57 and the housing. Similarly, when the shoulder 52 of the rod head 48 engages the wall projection 53, a fluid tight seal is obtained between the chambers 41 and 42, and, inasmuch as this is the normal position of the apparatus, the cooled air in the chamber 42 is isolated for the major portion of each cycle of the apparatus.

By thus completely shielding the power bellows from heat transfer from the incoming refrigerant, or local temperature variations in the medium around the exterior of the housing 34, the expansion or contraction of the bellows 38 is made solely responsive to the temperature at the bulb 45, which condition, of course, is the one desired.

I claim:

1. In a refrigerant control device, a body, a valve therein, sealing bellows mounted on the body and operable in response to low side pressure to actuate the valve, a thermostatic bellows responsive to temperature conditions, a housing secured to the body and cooperating to enclose said sealing bellows, means in said housing for mounting said thermostatic bellows, a wall in said housing separating said bellows and dividing the interior of the housing into two chambers, said wall having a stop portion formed on one face and engageable by said thermostatic bellows to limit the movement thereof, said wall on its opposite face having a seat formed thereon, and a rod extending through said wall and connecting the sealing bellows for operation by the thermostatic bellows, said rod having a valve face adapted to engage said seat both to act as a stop for the sealing bellows and to prevent communication between said chambers.

2. In a refrigerant control device, a body, a valve therein, a sealing bellows mounted on the body and operable to actuate said valve, a housing secured to the body and cooperating to enclose said bellows, a thermostatic bellows mounted within said housing, a stem on said thermostatic bellows extending through the housing, means connecting the sealing bellows for operation by the thermostatic bellows, means for adjusting said thermostatic bellows toward or from said sealing bellows comprising a sleeve engaging about and having a screw engagement with said stem, a valve portion formed on the sleeve and a seat formed on the housing for receiving the same, to prevent air entry into the housing, said sleeve projecting through the housing and having a portion adapted to be manipulated by a suitable tool, and a packing between the stem and sleeve.

3. In a thermostatic valve including a valve casing, a valve in said casing, a projecting portion, a sealing bellows mounted in said portion, and means extending from said bellows to said valve, an actuating element mounted on said casing and said portion, said element comprising a housing snugly fitting said projecting portion, a wall disposed transversely of said housing dividing the same into two chambers, said wall being formed with an aperture at the center thereof, an actuating pin positioned in said aperture, said pin extending into said sealing bellows to operate the same, a power bellows mounted in said housing and in the other chamber thereof, one end of said power bellows being in contact with the opposite end of said actuating pin, and means extending through the end of said housing opposite said sealing bellows for adjusting said power bellows.

4. In a thermostatic valve, a body, a valve therein, sealing bellows mounted on the body and operable in response to low side pressure to actuate the valve, a thermostatic control unit for the valve comprising a housing having an open end removably secured to the body and having an opposite closed end formed with an opening, a nut mounted for rotatable movement in the housing opening and having an internal threaded opening, a power bellows in the housing having a threaded hollow stem adjustably received in the nut opening, a tube communicating with the stem, a bulb secured to the tube and being insertable through the nut opening when the power bellows is assembled with the housing, a wall member removably mounted in the open end of the housing and engageable with the power bellows, and means extending through the wall member and connecting the power bellows and sealing bellows.

FRANKLIN G. SLAGEL.